United States Patent
Kalos et al.

(10) Patent No.: US 7,958,406 B2
(45) Date of Patent: Jun. 7, 2011

(54) VERIFYING A RECORD AS PART OF AN OPERATION TO MODIFY THE RECORD

(75) Inventors: Matthew Joseph Kalos, Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 11/538,401

(22) Filed: Oct. 3, 2006

(65) Prior Publication Data
US 2008/0082496 A1 Apr. 3, 2008

(51) Int. Cl.
*G06F 17/30* (2006.01)
*G06F 17/00* (2006.01)

(52) U.S. Cl. .............. 714/52; 711/118; 714/53

(58) Field of Classification Search ....... 707/3; 711/118
See application file for complete search history.

(56) References Cited

U.S. PATENT DOCUMENTS

| | | | |
|---|---|---|---|
| 6,378,087 B1* | 4/2002 | Flanagan et al. | 714/38 |
| 6,715,036 B1* | 3/2004 | Burton et al. | 711/118 |
| 2002/0147886 A1* | 10/2002 | Yanai et al. | 711/112 |
| 2005/0097210 A1* | 5/2005 | Kane et al. | 709/225 |
| 2005/0138375 A1* | 6/2005 | Sadjadi | 713/167 |
| 2006/0064408 A1* | 3/2006 | Enbutsu et al. | 707/3 |
| 2006/0085665 A1 | 4/2006 | Knight et al. | |
| 2006/0129759 A1 | 6/2006 | Bartlett et al. | |
| 2006/0156154 A1* | 7/2006 | Driediger | 714/746 |
| 2006/0156175 A1 | 7/2006 | McClellan et al. | |
| 2007/0055674 A1* | 3/2007 | Sunada | 707/10 |
| 2008/0205655 A1* | 8/2008 | Wilkins et al. | 380/279 |

* cited by examiner

*Primary Examiner* — Pierre M Vital
*Assistant Examiner* — Sabana Rahman
(74) *Attorney, Agent, or Firm* — David W. Victor; Konrad Raynes & Victor LLP (57) ABSTRACT

Provided are a method, system and article of manufacture for verifying a record as part of an operation to modify the record. A search request is received to determine whether a record matches a value. A first component executes the search request to determine if the record matches the value. The first component sends a verify request to a second component that did not execute the search request to execute the search request to determine whether the record matches the value. A result of the first and second components executing the search request is logged.

15 Claims, 5 Drawing Sheets

VERIFYING A RECORD AS PART OF AN OPERATION TO MODIFY THE RECORD

BACKGROUND OF THE INVENTION

1. Field

The present invention relates to a method, system and article of manufacture for verifying a record as part of an operation to modify the record.

2. Description of the Related Art

In certain computing, environments multiple host systems may communicate with multiple control units (CUs) (also known as storage controllers storage subsystems enterprise storage servers, etc.) providing access to storage devices, such as interconnected hard disk drives through one or more logical paths. The interconnected drives may be configured as a Direct Access Storage Device (DASD), Redundant Array of Independent Disks (RAID), Just a Bunch of Disks (JBOD), etc. The control untill may configure one or more logical subsystems (LSSs), where each LSS is configured to include multiple volumes.

In certain situations, the host systems may want to modify a record managed by the control unit for which a lock must be obtained. As part of modifying the record, the host may issue a search command, through a channel subsystem program in the host, to have the control unit compare the record to modify with the value of the record when the modify operation began to determine whether the value has changed notwithstanding the lock on the record. If the search response indicates that the record value has not changed then the channel subsystem program may proceed to a next channel command word to send to the control it execute to modify locked record or other data object. If the record value has changed, i.e., the record does not match the search value then this failure may indicate a hardware and/or software problem in the control unit or host in such case, the channel subsystem program will proceed to an error handling mode and not proceed with the record modification.

There is a need in the art for improved techniques for handling atomic operations

SUMMARY

Provided are a method system, and article of manufacture for verifying a record as part of an operation to modify the record. A search request is received to determine whether a record matches a value. A first component executes the search request to determine if the record matches the value. The first component sends a verify request to a second component that did not execute the search request to execute the search request to determine whether the record matches the value. A result of the first and second components executing the search request is logged.

In further embodiments the first component is indicated to be in an error mode in response to the second component determining that the record matches the value, wherein in the error mode the first component is fenced from operations.

In further embodiments the verify, request to the second component includes an error checking code for the value and an address of the record. The second component further performs an error checking operation using the error checking code to validate the record address and the value used by the first component. The first component is indicated in an error mode in response to the second component determining that the error checking code does not validate the record address and the value.

In further embodiments, a determination is made as to whether a flag associated with the search request is set if the record does not match the value, therein the verify request is only sent to the second component in response to determining that the flag is set.

In further embodiments the flag being set indicates that the search request is part of an atomic operation to update data associated with the record.

In further embodiments, the result of the first component executing the search request is logged in response to determining that the flag is not set to indicate to send the verify request to the second component.

In further embodiments the searched record is a member of a set of records comprising a coupled data set record, herein the search is performed to determine whether a host is still a member of a managed group of hosts; and a volume table of contents record, wherein the search is performed to determine whether the value for the record has not changed during an operation to modify the record.

In further embodiments the first component comprises a network adaptor and wherein the second component comprises a processor complex.

Further provided is a method system, and article of manufacture that initiates an operation to modify a record in storage managed by a system. A command is sent to the system to set a lock to prevent other processes from modifying the record during the operation. The record is read from the storage to determine a value for the record. A search request is generated to the system to determine whether the record to modify has the determined value, wherein the system executes the search request using a first component. A flag is set to cause system to perform a secondary checking operation to reexecute the search request using a second component that was not involved in the execution of the search request by the first component in response to the system determining that the record does not match the value. The search request is transmitted to the system.

In further embodiments the flag is transmitted in a command for the search request.

In further embodiments, a result is received from the search request indicating whether the record matched the value the operation to modify, the record is continued in response to the result indicating; that the record did not match the value. The operation to modify the record is terminated in response to the result indicating that the record matched the value.

In further embodiments, the result indicates whether an error in the first component caused the record to not match the value. Error checking of components that initiated the operation and generated the search request is performed in response to the result indicating that the error was not the result of an error in the first component.

DETAILED DESCRIPTION

Figure 1:
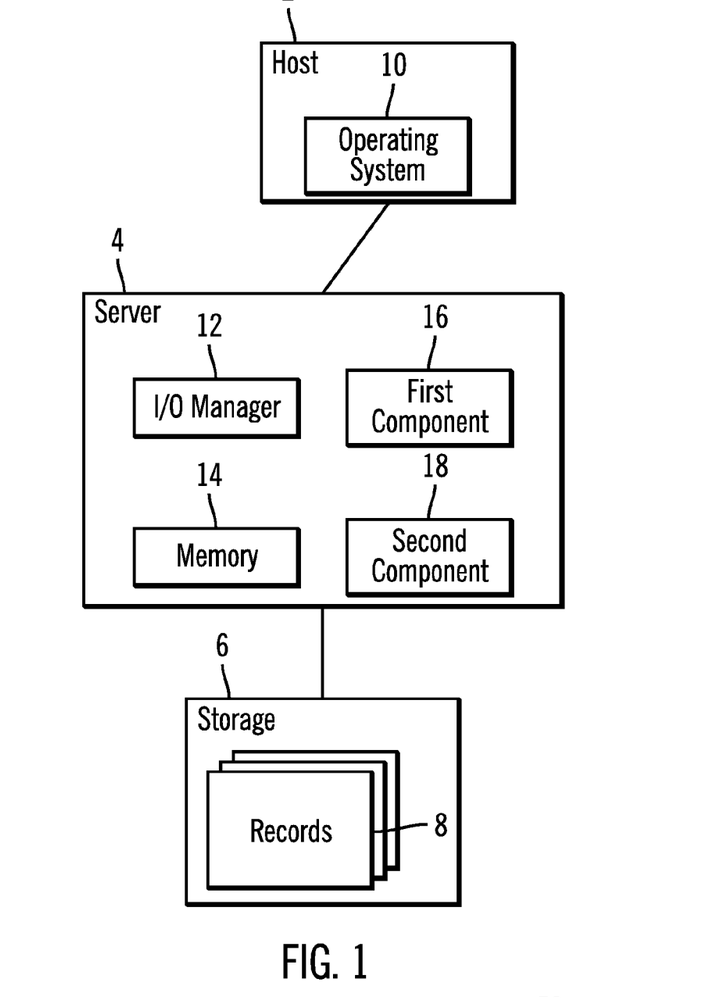
FIG. 1 illustrates an embodiment of a computing environment.

FIG. 1 illustrates a computing environment in which embodiments may be implemented. One or more hosts 2 (only one is shown) are in communication with a server 4 managing access to a storage 6 having records 8. The host 2 includes an operating system 10 to generate I/O requests to transmit to the server 4 to access the records 8 in the storage 6. The server 4 includes an Input/Output (I/O) manager 2 to manger I/O requests to the storage 6. The server 4 may cache records 8 and data from the storage 6 in a memory 14. The server 4 also includes multiple components, such as the shown first 16 and second 18 components. The first 16 and second 18 components may comprise hardware and/(or soft are components capable of performing 10 related requests with respect to the storage 6, such as a network adaptor, processing complex, controller, bridge, computer program, etc.

Figure 2:
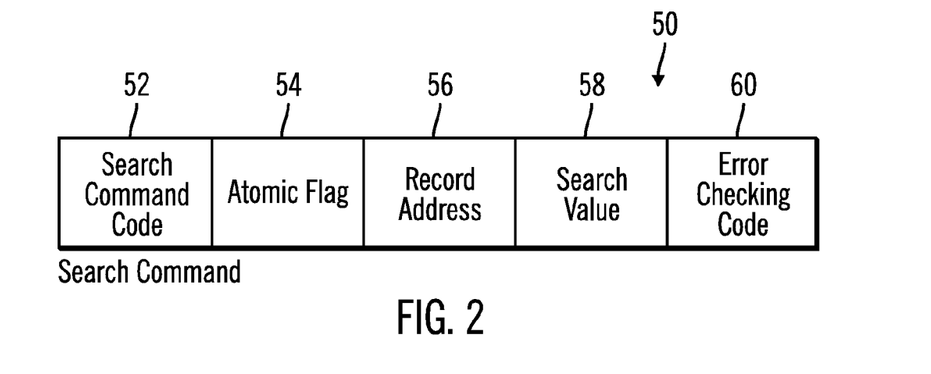
FIG. 2 illustrates an embodiment of a search command to compare the value of a record with a search value.

FIG. 2 illustrates an embodiment of a search command 50 that the host 2 may transmit to the server 4 as part of an operation to modify a record 8 to confirm that the value of the record 8 has not changed during the modification operation before performing the modification. The modification may comprise updating or deleting the target record 8. The search command 50 includes a search command code 52 specifying, a search request an atomic flag 54 indicating to the server 4 that the search request is part of an atomic operation, such as an operation to update or check a record 8 and determine whether the record 8 has changed a record address to identifying the record 8 to modify; a search value 58 indicating the value to confirm for the identified record 8; and an error checking code 60 for the record address 56 and the search value 56 such as a cyclical redundancy check (CRC) code in one embodiment, the error checking code 60 may comprise the error checking code included with the transmission packet in which the search request 50 is encapsulated. For instance, the error checking code 60 may be generated by the network protocol driver transmitting the search request used to validate the content of the transmission. In the embodiment of FIG. 2, the atomic flag 54 is included in the search command 50. In an alternative embodiment, the atomic flag 54 may be communicated separately from the search command 50 to the server 4.

Figure 3:
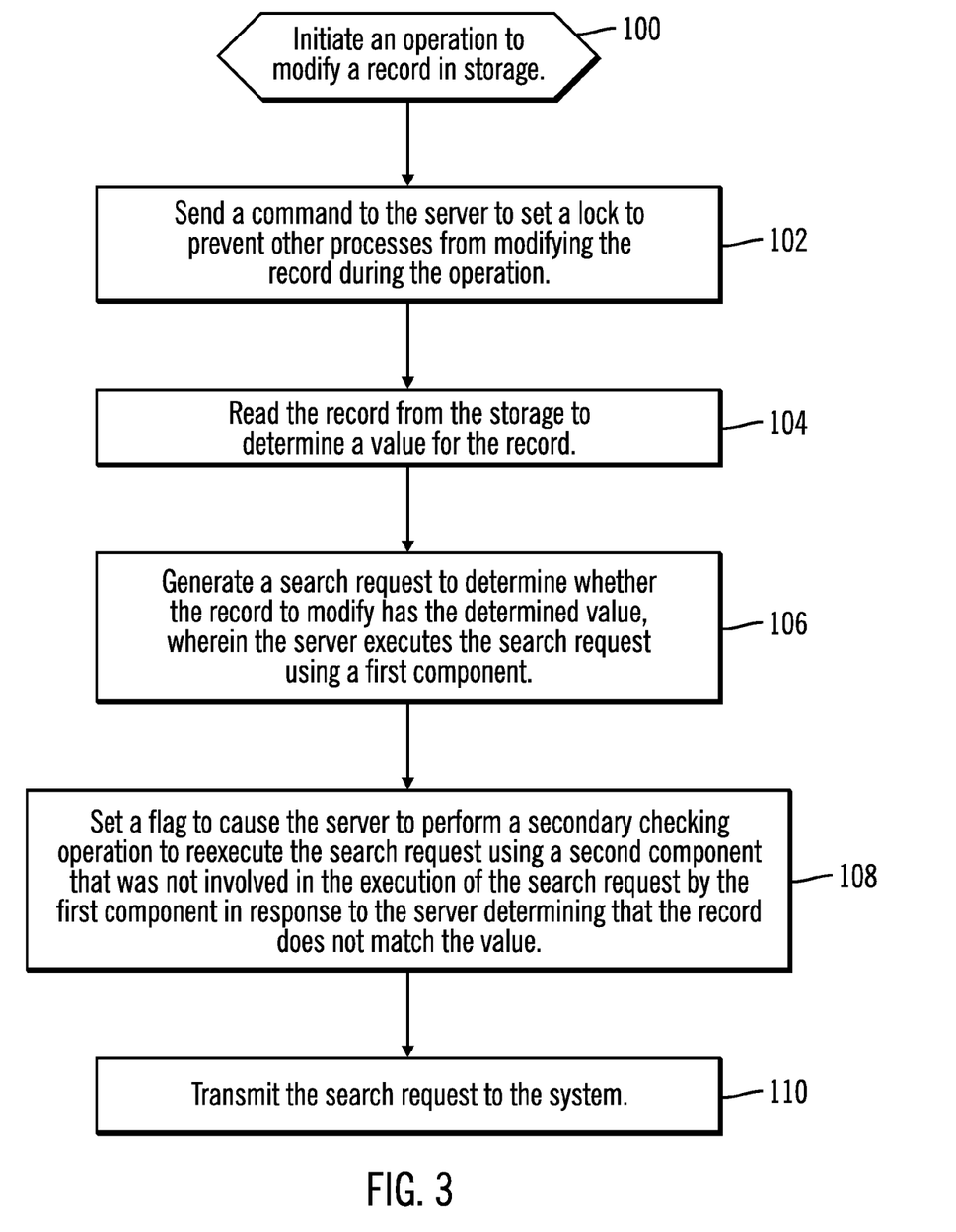
FIG. 3 illustrates an embodiment of operations to modify a record.

FIG. 3 illustrates an embodiment of operations performed by the host operating system 10 or some other program to perform operations to modify a record 8 in the storage 6. Upon initiating (at block 100) an operation to modify a record 8) the operating system 10 sends (at block 102) a command to the server 4 to set a lock to prevent other processes from modifying the record during the operation. The operating system 10 reads (at block 104) the record 8 from the storage to determine a value for the record 8. The record 8 may be, returned from the server memory 14. The operating system 10 generates (at block 106) a search request 50 to determine whether the record 8 to modify has the determined value, i.e., whether the record value has changed since the operation was initiated notwithistanding the lock. If the record has changed then this indicates there may be a hardware or software problem in the server 4 or host 2. A flag 54 is set (at block 108) to cause the server 4 to perform a secondary checking operation to reexecute the search request using a second component 18 that was not involved in the execution of the search request by a first component 16 if the server 4 determines that the record 8 does not match the value. This allows the server 4 to check whether the determined mismatch in the record and the value is a result of an error in the first component 16 that executed the initial search command 50. The operating system 10 transmits (at block 110) the search command 50 to the server 4 to execute.

Figure 4:
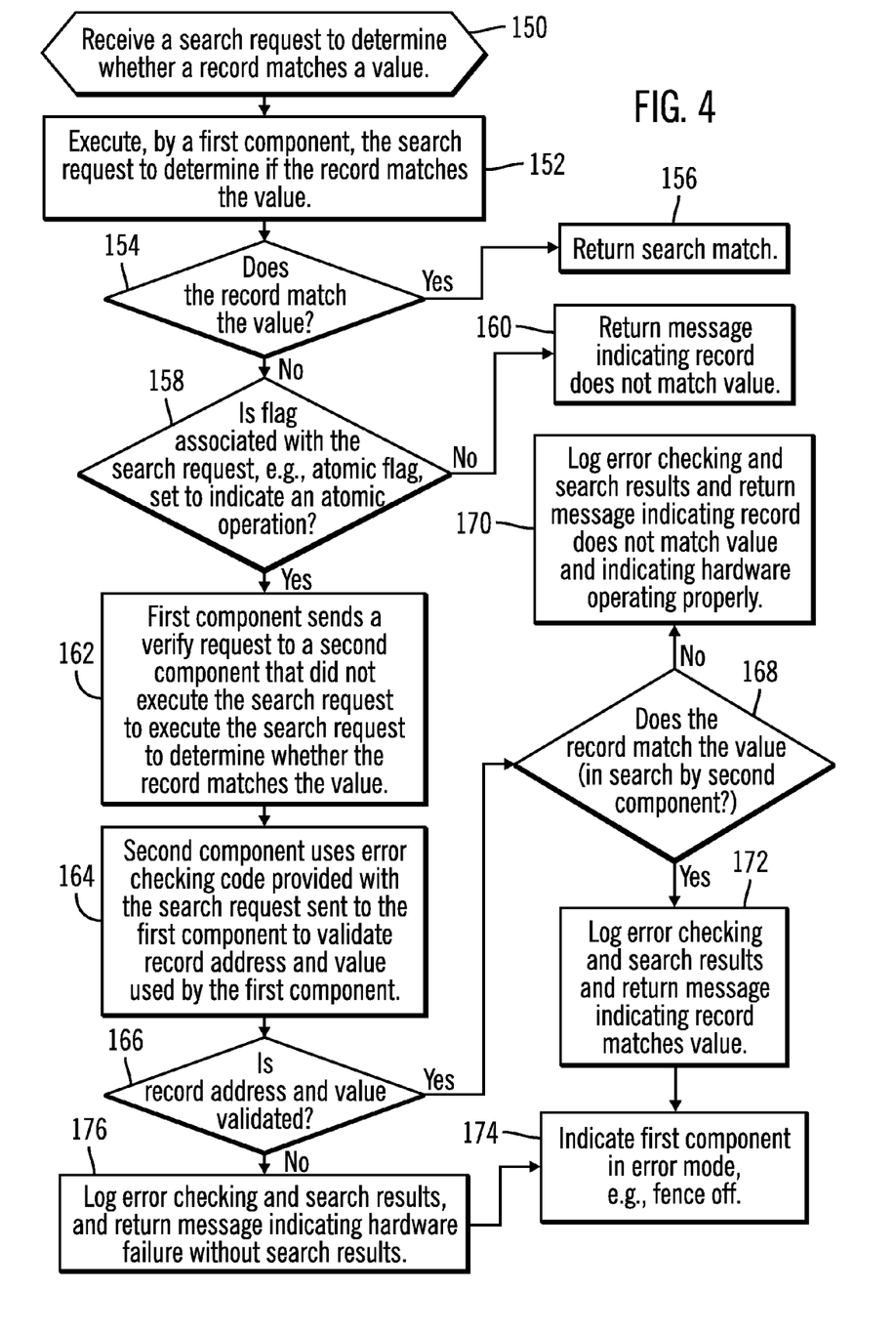
FIG. 4 illustrates an embodiment of operations to process a search command.

FIG. 4 illustrates an embodiment of operations performed by the first 16 and second 18 components to process a search command 50 from the host 2. Upon receiving (at block 150) a search request 50 to determine whether a record 56 matches a value 58, a first component 16 (e.g., an adaptor or other hardware and/or software component) executes (at block 152) the search request to determine whether the record at the record address 56 matches the search value 58. If (at block 154) the record matches the value 58, then the first component 16 returns (at block 156) status that the search matched to the host 2. If (at block 154) the record did not match the value, then the first component 16 determines (at block 158) whether the atomic flag 54 associated with the search request 50 is set to indicate that the search request is part of an atomic operation such as an operation to modify the record 8 that was just checked. If the atomic flag 54 is not set to indicate an atomic operating then the first component 16 returns (at block 160) a message indicated that record does not match value 58.

If (at block 158) the atomic flag, 4 is set, then the first component 16 sends (at block 162) a verify request to the second component 18 (e, a processor complex; or other hardware and/or software) that did not execute (or was not involved in processing) the search request to re-execute the search request to confirm whether the record does not match the value. The verify request from the first component 16 to the second component 18 may provide the record address 56 and search value 58 that the first component 116 used in its search. The second component 18 uses (at block 164) an error checking code 60 provided with the search request 90 sent to the first component 16 to validate the record address and value used by the first component 16. As discussed, the error checking code 60 may comprise the error checking code calculated by a network transmission protocol driver and included in the transmission package encapsulating the search command transmitted from the host 2 to the server 4. If (at block 166) the record address and value used by the first component 16 are validated, then the first component 16 used the correct information and the second components 18 determines (at block 168) whether the record at the provided record address matches the provided value. If (at block 168) there is no match then the first component 16 properly calculated the lack of match, and the second component 18 to the error checking information for the hardware and search results and returns (at block 170) a message indicating that the record does not match and indicating that the server hardware is operating properly.

If (at block 168) there is a match, i.e., the second component 18 obtained a different result from the first component 64, then the second component 18 logs the error checking information and search results and returns (at block 17) a message indicating that the record matches the search value 58. The different result determined by the second component 18 indicates that there is likely some problem with the first component 16 hardware and/or logic, which determined a result different than expected, i.e., that the record matches the value. In such case, the second component 18 indicates (at block 174) that the first component 16 is in an error mode, which may involve fencing-off the first component 16 from operations. If there are redundant instances of the first component 16, such as multiple adaptors, then fencing of the first component 16 may not disrupt the server 4 operations.

If (at block 166) the second component 18 does not validate the record address and value that the error checking code 60 then the first component 16 may not be operating properly because the first component 16 used a record address or search value which was provided to the second component 18, that is different from the record address 56 or search value 58 transmitted by the host 2. In such case, the second component 18 proceeds to block 174 to fence-off the first component 16 from operations.

Certain of the operations described as performed by the first 16 and second 18 components may be performed by the manager 12 or other components in the server 4.

Figure 5:
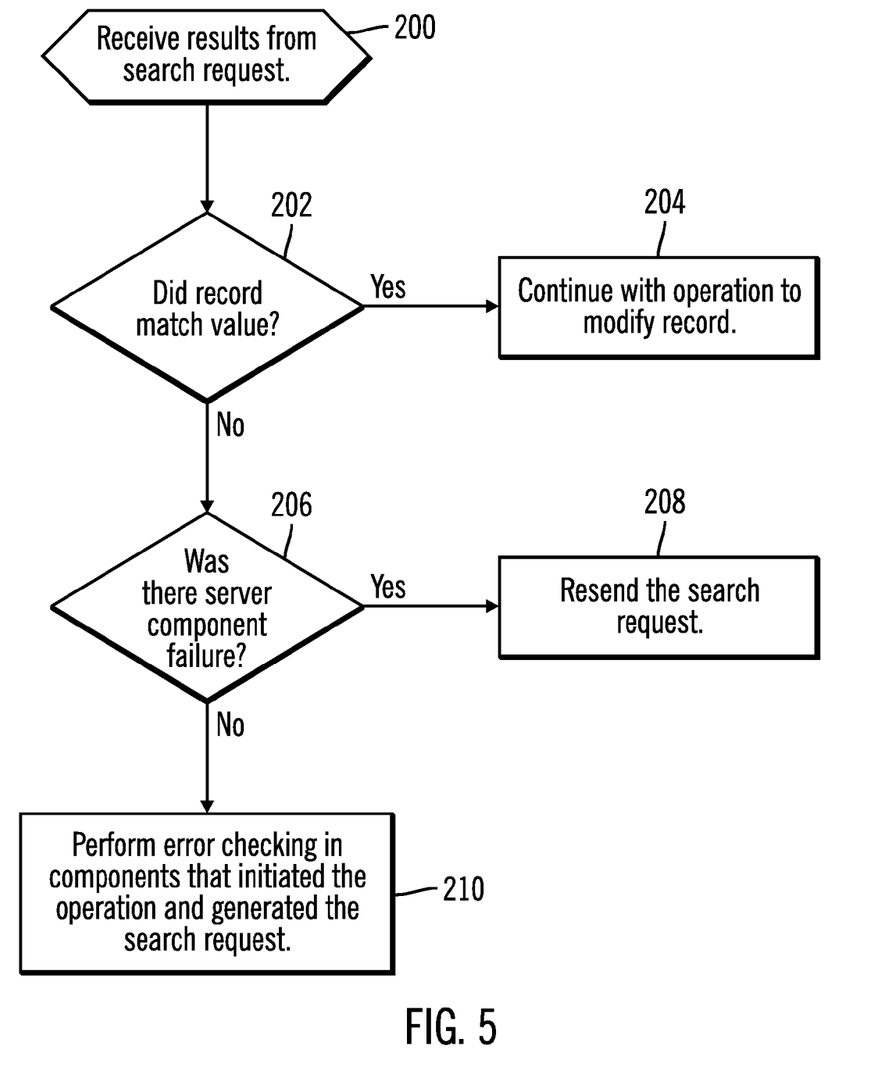
FIG. 5 illustrates an embodiment of operations to process the results of the search command.

FIG. 5 illustrates an embodiment of operations performed by the operating system to process the results received from the server 4 in response to the search command 50. Upon receiving (at block 200) the results from the server 4 in response to the search command 50, if the response indicates (at block 202) that the record at the provided address 56 matches the provided search value 58, then the operating system 10 continues with the operation to modify (at block 204) the record 8. If (at block 202) the response indicates that that record did not match the value 58, indicating that the record 8 changed notwithstanding, the lock placed on the record 8, then the operating system 10 determines (at block 206) whether there was a server component failure which resulted in the farther, such as a failure of the first component 16 (e.g., adaptor, hardware and/or software). If there was a server component failure, then the operating system 10 may resend (at block 208) the search command 50 so that a failover component for the failed and fenced-off first component can handle the search request one of the other available redundant adaptors. If (at block 208) the message does not indicate that there was a problem or error at the server component 16) then the operating system 10 may perform (at block 210) error checking, of host 2 components that initiated the modification operation and generated the search request 50 to diagnosis the problem.

With the described embodiments, the second component 18 checks the search results determined by the first component 16 if the first component 16 obtains a search result that is not expected. For instance) if a lock was obtained on the record 8 (or data structure) e.g., table, object; etc. including the record 8) then it would be expected that the record value determined after the lock is placed has not changed. If the first component 16 determines a search outcome that is not expected) then the second component 18 recalculates the result as part of a troubleshooting operation to determine whether the error lies in the hardware and/or logic (e.g., software) of the first component 16.

Figure 6:
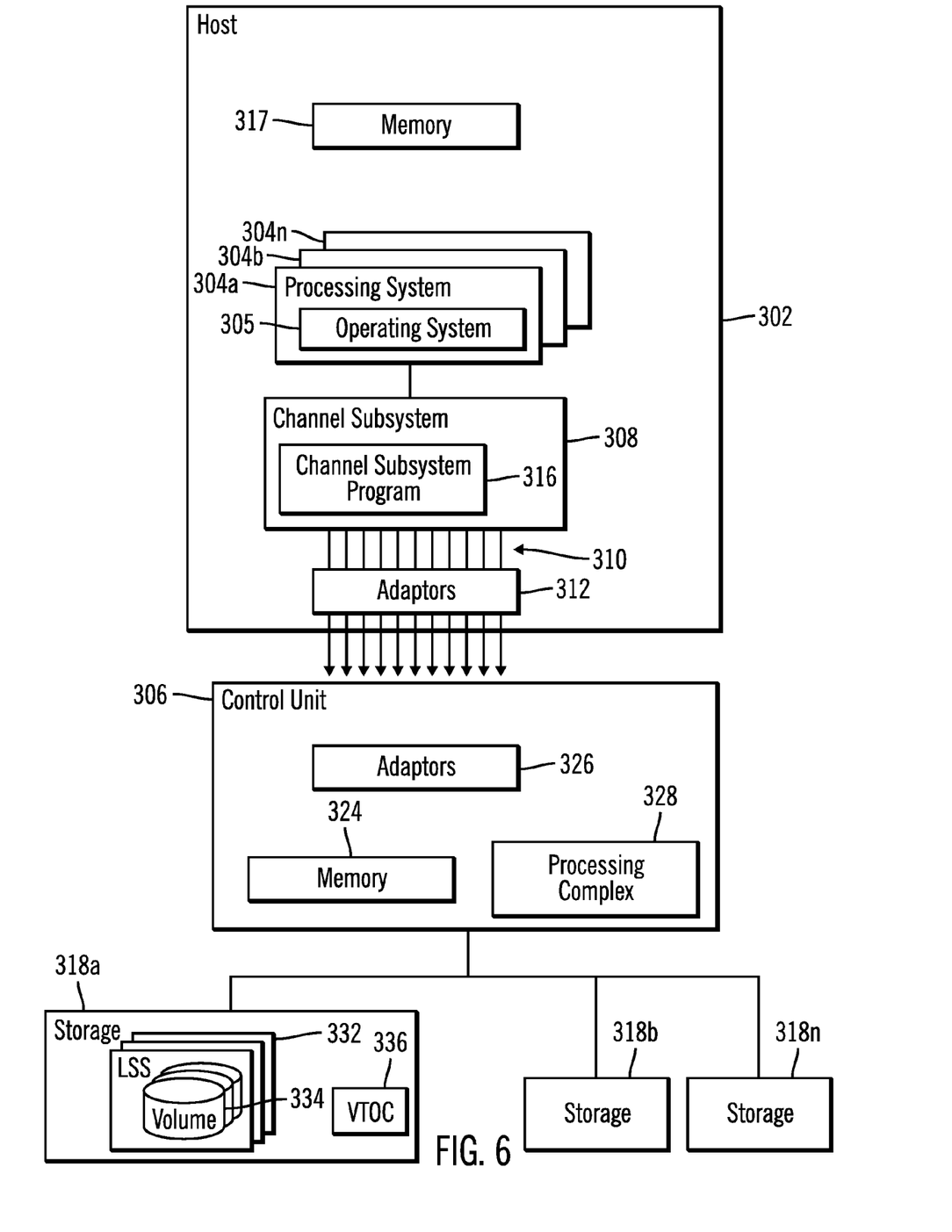
FIG. 6 illustrates an alternative embodiment of a computing environment.

FIG. 6 illustrates an alternative computing environment embodiment. One or more hosts 302 (only one is shown include one or more processing systems 304a) 304b ... 304n that communicate Input/Output (I/O) requests to a control unit 306 through a channel subsystem 308 that provides a plurality of logical paths to the control unit 306. Each processing system 304a, 304b ... 304n includes an operating system 305 to manage path related operations. The channel subsystem 308 manages logical paths 310 extending through adaptors 312. An adaptor 112 provides the physical layer through which logical paths 310 extend to the controls unit 306 or multiple control units through a switch (not shown). The operating system 305 may further associate multiple logical paths 310 with a path group) where all the paths in a path group may be used by one processing system 304a, 304b ... 304n to communicate with the control unit 306.

Each processing system 304a, 304b ... 304n may comprise a central processing unit (CPU) executing programs) including the operating system 305 and channel subsystem 308 code. Alternatively each processing system 304a, 304b ... 304n may comprise one of multiple logical partitions (LPARs) that each operate as independent systems, executing their own operating system 305 and may share channel subsystem 308 code. In further embodiments, each processing, system may comprise a logical partition of a processor. In this way, one or more processors in the host 2 may implement multiple logical partitions (LPARs). Multiple processing systems 304a, 304b ... 304n may state a single logical channel subsystem or different processing systems 304a, 304b ... 304n may use different logical channel subsystems.

The channel subsystem 38 includes a channel subsystem program 316 to perform the operations to communicate I/O requests from the processing systems 304a, 304b ... 304n to the control unit 306. The operating system 305 manages I/O requests. The channel subsystem program 316 obtains the I/O request from the channel subsystem 308. A memory, 317, comprised of one or more memory, devices, includes information used by the channel subsystem program 16 to manage/requests.

The channel subsystem program 316 may process a channel program, comprising CCW commands including the search command 50 as part of an operation to modify a record managed by, the control unit 306, such as an operation to modify, an entry in a Volume Table of Contents (VTOC). Thus, the channel subsystem program 316 may execute a chain of commands to perform the operations FIGS. 3 and 5 to determine whether the record to update has been modified since the lock was obtained on the table or other data structure including the record to modify, e.g. a VTOC.

The control unit 306 images requests from the processing systems 304a, 304b ... 304n to access storage systems 318a, 318b .... 318n, such as tracks, partitions, logical devices, logical volumes, logical unit numbers (LUNs), logical subsystems (LSS) or other logical or physical units of storage. Storage 34 are configuration including one or more LSSs 32, where one or more volumes 34 are configured in each LSS 32. The volumes may extend across multiple storage deices. The term "device" refers to any physical or logical data storage unit, such as a physical track, LSS, partition, logical volume, volume, etc. The control unit 306 includes a memory 324 in which data from the storage systems 318a, 318b ... 318n may be buffered, adaptors 326 to receive commands and requests from the hosts 302, and a processing complex 328. The storage 318a may further include a volume table of contents (VTOC) 336 providing information on each data set defined in the volumes 334, including the extents of storage locations assigned to each defined data set.

In one embodiment the adaptors 326 may comprise the first components that initially checks the record indicated in a search command and the processing complex 328 may comprise the second component that performs the checking operations to check the search checking performed by the adaptors 326.

The hosts 302 may comprise computational devices known in the art, such as a workstation, mainframe, server, etc. The control unit 306 may comprise a storage subsystem or server such as an enterprise storage server, storage controller, etc., or other device used to manage I/O requests to attached volumes. The storages 318a, 318b ... 318n may comprise storage devices known in the art such as interconnected hard disk drives (e.g. configured as a DASD, RAID, JBOD, virtualized devices etc.), magnetic tape, electronic memory, flash memory, optical disk, etc. The host 302 may communicate with the control unit 306 over the logical paths 310 which may extend through a network, such as a Local Area Network (LAN), Storage Area Network (SXN), Wide Area Network (WAN), peer-to-peer network wireless network, etc. Alternatively, the host 302 may communicate with the storage controller 6 over a by interface, such as a Peripheral Component Interconnect (PCI) plus or serial interface.

Additional Embodiment Details

The described operations may be implemented as a method, apparatus or article of manufacture using standard programming and or engineering techniques to produce software, firmware, hardware, or any, combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape etc.) optical storage (CD-ROMs, DVDs, optical disks, etc.), volatile and non-volatile memory devices (e.g., EEPROMs, ROMs, PROMs, RAMs, DRAMs, SRAMs. Flash Memory, firmware, programmable logic etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmisson Signals in which the code or logic is encoded is capable of being transmitted by a transmitting station and received by a receiving station, where the code or logic encoded in the transmission signal may be decoded and stored in hardsware or a computer readable medium at the receiving and transmitting statitons or devices. An "article of manufacture" comprises computer readable medium hardware logic, and/or transmission signals in which code may be implemented. A device in which the code implementing the described embodiments of operations is encoded may comprise a computer readable medium or hardware logic of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified therewise.

The enumerated listing of items does not imply that any or all of the items are manually exclusive, unless expressly specified otherwise.

The terms "a", "an" and "the" mean "one or more" unless expressly specified otherwise.

Devices that are in communication with each other need not be in continuous communication with each other, unless expressly specified otherwise in addition, devices that are in communication with each other may communicate directly or indirectly through one or more intermediaries.

A description of an embodiment with several components in communication with each other does not imply that all such components are required. On the contrary a variety of optional components are described to illustrate the wide variety, of possible embodiments of the present invention.

Further, although process steps, method steps, algorithms (or the like may be described in a sequential order, such processes, methods and algorithms may be configured to work in alternate orders. In other words any sequence or order of steps that may be described does not necessarily indicate a requirement that the steps be performed in that order. The steps of processes described herein may be performed in any order practical. Further, some steps bay be performed simultaneously.

When a single device or article is described herein, it will be readily apparent that more than one device article (whether or not they cooperate) may be used in place of a single device/article. Similarly where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality features. Thus, other embodiments of the present invention need not include the device itself.

Further, when a reference letter, such as "a", "b", or "n" is used to denote a certain number of items, the reference "a", "b" or "n," used with different elements may indicate the same or different number of such elements.

FIG. 2 shows information maintained in a certain format. In alternative embodiments, the information shown in these figures may be maintained in alternative data structures and formats, and in different combinations.

The illustrated operations of FIGS. 3, 4, and 5 show certain events occurring in a certain order. In alternative embodiments certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

There foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete descrition of the manufacture and use of the composition of the invention. Since many embodiments of the invention can be made without departing from the spirit and scope of the invention, the invention resides in the claims hereinafter appended.

What is claimed is:
1. A method, comprising:
   receiving a search request to determine whether a record, comprising a volume table of contents record, at a record address in a storage matches a record value;
   executing, by a first component, the search request to determine if the record at the record address matches the record value to determine whether the value for the record has not changed during an operation to modify the record;

sending, by the first component, a verify request to a second component that did not execute the search request to execute the search request to determine whether the record at the record address matches the record value in response to the first component determining that the record at the record address does not match the record value, wherein the verify request to the second component includes an error checking code for the record value and an address of the record;

performing, by the second component, an error checking operation using the error checking code to validate the record address and the record value used by the first component;

indicating the first component in an error mode in response to the second component determining that the record matches the record value, wherein in the error mode the first component is fenced-off from operations;

indicating the first component in an error mode in response to the second component determining that the error checking code does not validate the record address and the record value; and logging a result of the first and second components executing the search request.

2. The method of claim 1, further comprising:
determining whether a flag associated with the search request is set if the record does not match the record value, wherein the verify request is only sent to the second component in response to determining that the flag is set.

3. The method of claim 2, wherein the flag being set indicates that the search request is part of an atomic operation to update data associated with the record.

4. The method of claim 2, further comprising:
logging the result of the first component executing the search request in response to determining that the flag is not set to indicate to send the verify request to the second component.

5. The method of claim 1, wherein the first component comprises a network adaptor and wherein the second component comprises a processor complex.

6. A system, comprising:
a first component;
a second component;
a device implementing code that is executed by at least the first and second components to cause operations to be performed, the operations comprising:
receiving a search request to determine whether a record, comprising a volume table of contents record, at a record address in a storage matches a record value;
executing, by a first component, the search request to determine if the record at the record address matches the record value to determine whether the value for the record has not changed during an operation to modify the record;
sending, by the first component, a verify request to a second component that did not execute the search request to execute the search request to determine whether the record at the record address matches the record value in response to the first component determining that the record at the record address does not match the record value, wherein the verify request to the second component includes an error checking code for the record value and an address of the record;
performing, by the second component, an error checking operation using the error checking code to validate the record address and the record value used by the first component;
indicating the first component in an error mode in response to the second component determining that the record matches the record value, wherein in the error mode the first component is fenced-off from operations;
indicating the first component in an error mode in response to the second component determining that the error checking code does not validate the record address and the record value; and
logging a result of the first and second components executing the search request.

7. The system of claim 6, wherein the operations further comprise:
determining whether a flag associated with the search request is set if the record does not match the record value, wherein the verify request is only sent to the second component in response to determining that the flag is set.

8. The system of claim 7, wherein the flag being set indicates that the search request is part of an atomic operation to update data associated with the record.

9. The system of claim 7, wherein the operations further comprise:
logging the result of the first component executing the search request in response to determining that the flag is not set to indicate to send the verify request to the second component.

10. The system of claim 6, wherein the first component comprises a network adaptor and wherein the second component comprises a processor complex.

11. An article of manufacture comprising code implemented in a system having a first and second components that is executed to perform operations, the operations comprising:
receiving a search request to determine whether a record, comprising a volume table of contents record, at a record address in a storage matches a record value;
executing, by a first component, the search request to determine if the record at the record address matches the record value to determine whether the value for the record has not changed during an operation to modify the record;
sending, by the first component, a verify request to a second component that did not execute the search request to execute the search request to determine whether the record at the record address matches the record value in response to the first component determining that the record at the record address does not match the record value, wherein the verify request to the second component includes an error checking code for the record value and an address of the record;
performing, by the second component, an error checking operation using the error checking code to validate the record address and the record value used by the first component;
indicating the first component in an error mode in response to the second component determining that the record matches the record value, wherein in the error mode the first component is fenced-off from operations;
indicating the first component in an error mode in response to the second component determining that the error checking code does not validate the record address and the record value; and logging a result of the first and second components executing the search request.

12. The article of manufacture of claim 11, wherein the operations further comprise:
   determining whether a flag associated with the search request is set if the record does not match the record value, wherein the verify request is only sent to the second component in response to determining that the flag is set.

13. The article of manufacture of claim 12, wherein the flag being set indicates that the search request is part of an atomic operation to update data associated with the record.

14. The article of manufacture of claim 12, wherein the operations further comprise:
   logging the result of the first component executing the search request in response to determining that the flag is not set to indicate to send the verify request to the second component.

15. The article of manufacture of claim 11, wherein the first component comprises a network adaptor and wherein the second component comprises a processor complex.

* * * * *